United States Patent [19]

Koppe et al.

[11] 4,321,967
[45] Mar. 30, 1982

[54] SUCTION OF GASES FROM BOREHOLES IN COAL MINING

[75] Inventors: Uwe Koppe, Velbert; Walter Stegmanns, Oberhausen; Horst Weisner, Herdecke, all of Fed. Rep. of Germany

[73] Assignee: Maschinenfabrik Korfmann GmbH, Fed. Rep. of Germany

[21] Appl. No.: 171,009

[22] Filed: Jul. 18, 1980

[30] Foreign Application Priority Data

Jul. 21, 1979 [DE] Fed. Rep. of Germany ....... 2929677

[51] Int. Cl.³ .................. E21B 33/124; E21B 33/134; E21F 7/00
[52] U.S. Cl. ................................... 166/250; 166/295; 299/12
[58] Field of Search ............... 299/12, 10, 1; 166/294, 166/295, 250, 314

[56] References Cited

U.S. PATENT DOCUMENTS 4,008,576  2/1977  Meyer et al. ..................... 299/12 X

FOREIGN PATENT DOCUMENTS 1939989  2/1971  Fed. Rep. of Germany .
2255267  5/1974  Fed. Rep. of Germany .
2556316  6/1977  Fed. Rep. of Germany ........ 299/12
2618787  11/1977  Fed. Rep. of Germany ........ 299/12

Primary Examiner—Stephen J. Novosad
Attorney, Agent, or Firm—Robert E. Burns; Emmanuel J. Lobato; Bruce L. Adams

[57] ABSTRACT

Gas, particularly methane, is sucked from a borehole (B) extending from a coal mine working by means of a casing consisting of tubular plastics sections (8) by means of a vacuum pump connected to the lower end of the casing. The casing is sealed to the borehole by a sliding seal (2) which allows the casing to be moved up and down the borehole until the upper end of the casing is at the level of the maximum yield of gas. The annular space between the casing and borehole wall is then filled with a liquid which expands and sets to form a polyurethane foam (4).

12 Claims, 8 Drawing Figures

SUCTION OF GASES FROM BOREHOLES IN COAL MINING

The invention relates to a process for drawing off gas by suction from boreholes in coal mines by means of sealed casings, which are inserted in the boreholes and can be moved to and fro along the borehole, and to a borehole assembly for this purpose.

According to West German Pat. No. 19 39 989, an elastic seal for sealing casings in boreholes for drawing off gas by suction in coal mining is known, the elastic seal being compressed to a diameter below the diameter of the borehole on introduction of the casing into the drilling. A jacket-like envelope serves for this purpose, which can be pulled off from the elastic seal by means of a tension means passing out of the borehole. In this case, the elastic seal preferably consists of open-pore elastomers. In this way, the elastic seal can be conveniently introduced with the casing into the borehole, although, in the relaxed state, the diameter of the seal is larger than the internal diameter of the borehole. The disadvantage of this type of casing and seal lies in the fact that it is not possible to measure the point of maximum $CH_4$-yield in the drilling, with the casing being fixed and sealed, and it is not possible to move the end of the casing in the drilling to the position of maximum $CH_4$-yield.

Furthermore, it is known to use expanded sealing materials which are pumped up through a separate line, passing up through the casing to the level of the seal, where the line extends out through the wall of the casing. Expanded sealing materials of this type require complex seals at the passage point through the casing; and besides, difficulty lies in keeping the expanded seal pressure constant.

Furthermore, it is known to fill up the annular space between the casing and the borehole wall with a sealing composition, for example with a cement sludge. Although a seal between the whole of the surface of the casing and the wall of the borehole can be achieved with a borehole seal made with cement sludge, it is disadvantageous insofar as, shortly after the setting of the cement sludge, leaks appear. For example, the surrounding ground movement damages the cement jacket around the suction casing, and the jacket develops cracks to a marked extent, so that short circuits occur around the casing after a short time. A further disadvantage lies, as in the casing according to West German Pat. No. 19 39 989, in the fact that the casing has to be inserted up to the intended suction level before the cement sludge can be introduced as a sealing agent into the hollow space between casing and borehole wall. Furthermore, sealing materials are known, which have to be pressed against a borehole wall after insertion through an auxiliary drilling. This is true of the Densoband plugs, the rubber cap sleeves of the Hamacher casing and the drilling standpipe method according to Korfmann, using a synthetic resin ring as a sealing element. All these techniques mentioned have in common that the casing level is predetermined, and it is uncertain that this corresponds with the level of maximum $CH_4$-yield.

A process is, in fact, known from West German Offenlegungsschrift No. 22 55 267 of the Korfmann company, in which the casing after its introduction, can be shifted to a selected level depending on the $CH_4$-concentration, which is ascertained by means of a measuring probe, and in which the $CH_4$-content and the flow rate of the suction gas mixture, related to the flow cross-section, can be measured at all levels of the gas borehole, the seal being fully effective during the course of gas suction.

The plugs, which have been proposed there for sealing, consisting of an elastic core, provided with a lubricant composition and a coating; or of an elastic core, such as foamed rubber, attached to the casing with a superimposed plastics sealing and lubricating composition and of a wear-resistant and extensible stretch coating, enclosing the core and the sealing composition, however, do not achieve optimum sealing, as experiments have shown. In the use of these sealing plugs, fixed to the upper and lower ends of the casing, weather short circuits continue to occur, so that not all the $CH_4$, emanating into the borehole at overpressure passes into the casing but some passes directly through the seals into the working. Low $CH_4$-yield and relatively large weather short-circuit flow however amounts to a considerable load on the suction piping system and bad utilization of the vacuum output of the pump. Furthermore, safety in the mine is reduced by a high $CH_4$-content in the air and coal production is impaired as a result of the shutdown periods in the working, caused by gas emission.

A further disadvantage of the casing according to West German Offenlegugnsschrift No. 22 55 267 lies in the fact that steel tubes are employed for the casing, and they have no elasticity and are not susceptible to plastic deformation. To that extent, adaptation of the casing, formed by individual tubular sections, to distortions of the boreholes resulting from ground movement is not possible. As a result, constrictions of the flow cross-section or even interruption of flow through the casing frequently occur.

It is an object of the invention to provide a process for drawing off gas by suction in coal mining by means of sealed casings, which are inserted in boreholes and can be moved to and fro, in which the disadvantages indicated are largely avoided.

In accordance with the invention, in a system of drawing off gas by suction in coal mining by means of a sealed casing which is inserted in a borehole and can be moved to and fro along the borehole, the gas suction casing is sealed to the borehole by a sliding seal, which permits movement of the tube in either direction along the borehole, the casing is moved along the borehole and the $CH_4$ content of gas sucked into the casing at various positions is measured, and with the casing position to suck in gas with substantially the maximum $CH_4$-content, an annular space formed between the gas suction casing and the wall of the borehole is at least partly filled with a liquid which forms in the space a polyurethane foam.

The measurement of the $CH_4$-content of the gas sucked into the casing will have to take account of the flow rate and flow cross section.

If foams are used with small quantities of resin and low pressure, and are e.g. produced by release of the liquid from a cartridge within the space, reinforcement in the rock or cell in the zones surrounding the tube casing may also result. Reinforcement may be achieved in more outlying zones of the coal bearing rock if the liquid is forced into the space, e.g. with the aid of gear pumps. Experiments have shown that when the annular space that is to be sealed is filled with foam in this way, a considerable reduction in the short circuit of the gas through weathering cracks, and an increase in the $CH_4$-yield is feasible. It is thus possible to give the casing optimum dimensions for determining the maximum $CH_4$-yield position, while the gas is drawn off by suction, and moving the casing to and fro. Subsequently, foaming is effected by means of the liquid for generation of the polyurethane foam. The suction tube efficiency of the degassing system and of the blower or other suction pump can then be efficiently utilized and the safety in the mine and the coal production improved compared to the prior art systems.

The hardening polyurethane foam conforms optimumly with cracks, drilling channels and borehole wall excavations in the borehole. It is thus possible, in a way somewhat similar to the sealing plugs according to West German Offenlegungsschrift No. 22 55 267, to overcome irregular borehole formations and to avoid short circuits in these zones. It the seals which are generally fixed at the leading and trailing ends of the casing, are also made of polyurethane plastics foam, homogeneous elastic sealing is possible along the whole of the casing in the borehole. The polyurethane plastics foam is preferably produced in the annular space from liquid synthetic materials marketed by Farbenfabriken Bayer AG, Leverkusen, under the designations Baygal K 55 B and Baymidur K 88. Baygal K 55 B consists of 100 parts by weight of Baygal K 55, 17.5 parts by weight of castor oil and from 0.5 to 3.0 parts by weight of water. A liquid quantity of 10 liters of these synthetic materials, corresponding to a height of 2 m in the annular space, expands, in this case, after forming and hardening, to a length of 8.4 m without shrinkage in volume on hardening. It is thus possible, through addition of definite volumes to determine the extent of foaming accurately. For introducing the liquid synthetic materials into the annular space, the so-called pouring method, using a heavy-duty double gear pump, or the so-called pressing method, using cartridges, containing the synthetic material components and introduced into the annular space, are suitable.

Since the sealing action of the polyurethane foam foamed in the annular space is superior to that of the sealing plugs according to West German Offenlegungsschrift No. 22 55 267, the gas suction casing need be provided only at its trailing end, facing the breastwall from which the borehole is bored, with a permanently fully effective seal and such quantity of liquid is introduced into the annular space between the gas suction casing and the wall of the borehole that the polyurethane foam, hardening with increase in volume, expands up adjacent to the level in the borehole of maximum $CH_4$-yield. The seal may be formed with an elastic core, surrounded by a lubricant composition and a coating, the cross-section of the core being normally larger than that of the borehole so that the core is compressed on insertion into the borehole.

An excellent system is provided if the casing is a plastics tubing, having an electrically conductive surface. The generally customary steel tubes are thus replaced by plastics tubing, so that no stress can arise in the casing and rupture cannot occur. It is desirable for this elastic or flexible tubing, to be made from individual tubular sections coupled by spigot and socket joints, having a triple edge seal between the tubular spigot end of one section and a tubular socket of the adjacent section.

Further advantages of this type of plastics tubing, preferably made from hard PVC, lie in the low weight of the tubing in comparison with steel tubes; the correspondingly simplified transportation to the place of use; and the easier handling in introducing the tubing into the gas borehole. Moreover, the corrosion resistance and smooth internal wall of the plastics tubing are of advantage in reducing friction losses during gas flow in the casing and thus also requiring smaller pressure requirements.

If a particularly elastic or flexible casing or foamed filler for the annular space is required, it is useful to employ a polyurethane plastics foam, which, in contrast to the mixture of Baygal and Baymidur, remains elastic after hardening. In that case, better access to drilling channels and cracks in the borehole wall is obtained. On account of the elasticity and apart from better adhesion and sealing at the tube and the borehole, rupture of the foamed mass and thus occurrence of short-circuits are also avoided.

An example of a borehole assembly according to the invention is illustrated in the accompanying drawings, in which.

Figure 3:
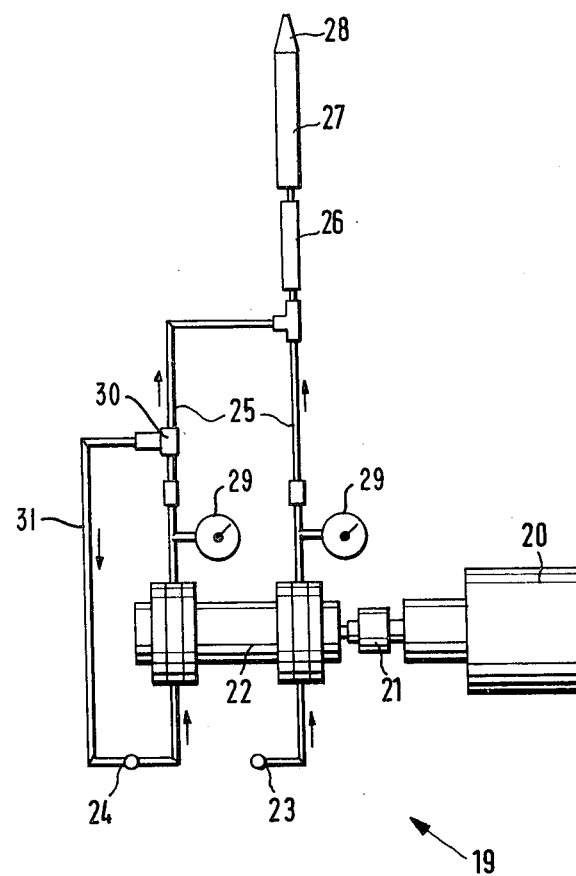
Figure 4A:
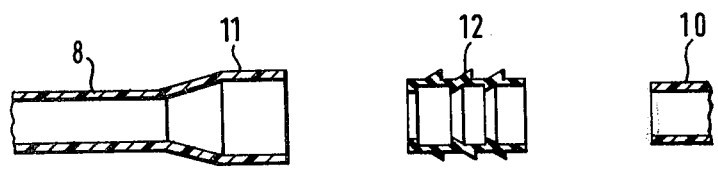
Figure 4B:
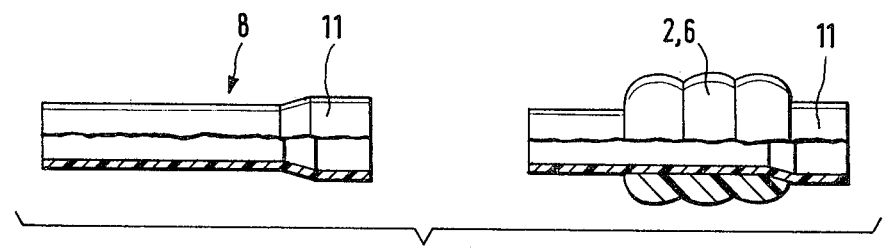
Figure 4C:
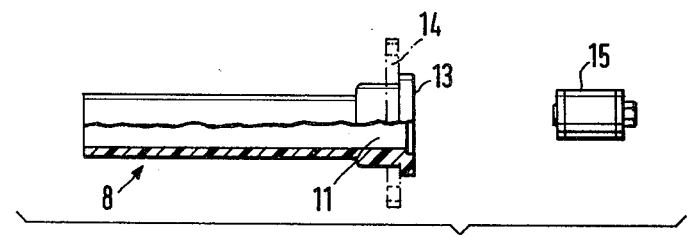
Figure 4D:
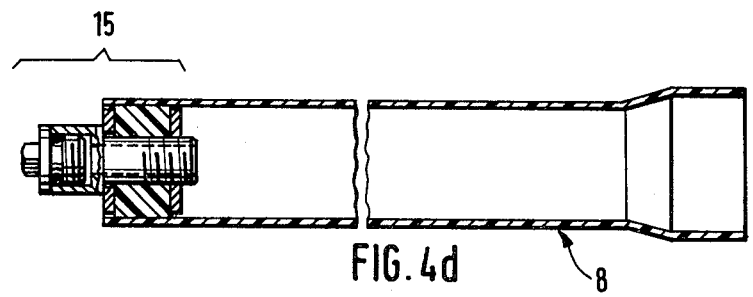
Figure 4E:
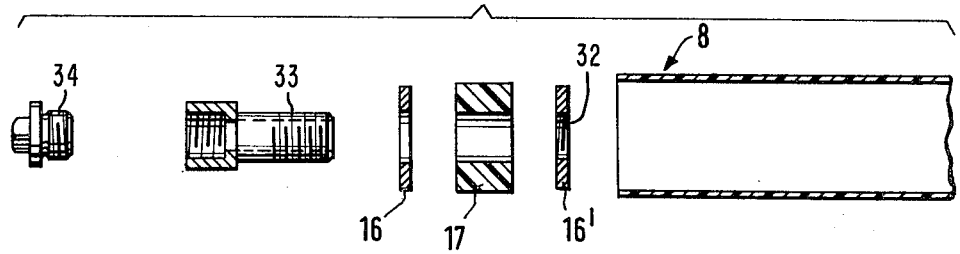

FIG. 3 is a schematic diagram of a synthetic resin pumping arrangement for introducing the liquid synthetic material components with a gear pump; and, FIGS. 4a and 4e show respectively a spigot and socket joint between casing sections; a section with elastic borehole seal; an end-section with collar and closure-plug; an end section with a closure-plug in place, and an end section with a closure-plug shown exploded into its individual parts.

Figure 1:
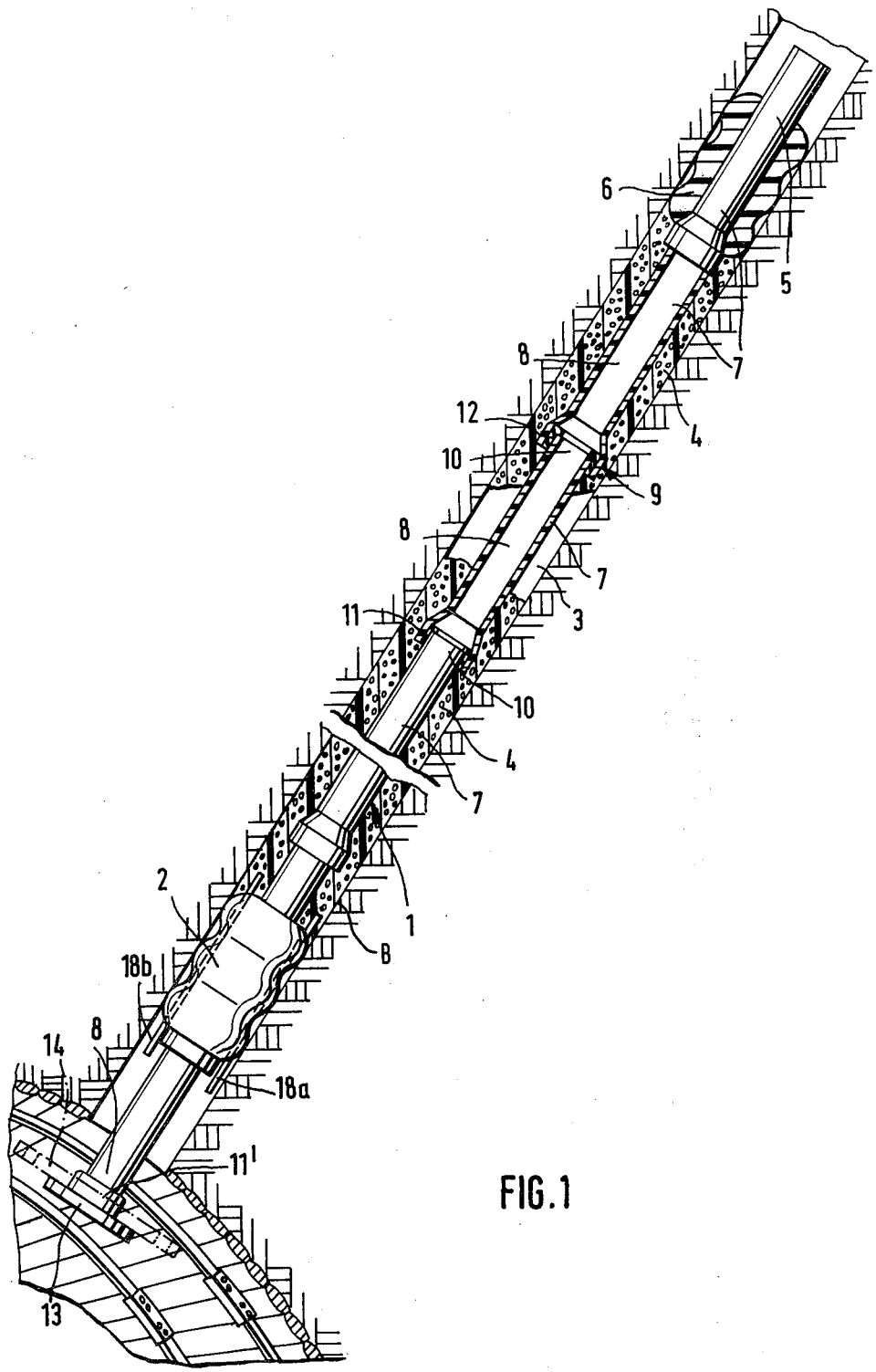
FIG. 1 is a diagrammatic axial section through a borehole with sliding polyurethane seals, an antistatic and low flammability PVC plastics casing, and an annular space around the casing filled with polyurethane foam.

FIG. 1 shows a gas suction tubular casing 1, composed of individual tubular sections 8, each having a length of 150 to 200 cm., with an annular space 3 between the gas suction casing 1 and a wall of a borehole B filled with polyurethane. In this case, the polyurethane plastics foam 4 extends along the whole length of the annular space between a lower seal 2 and an upper seal 6, which seal the borehole from the gas suction zone which is under vacuum. In this connection, the sliding seals 2, 6 allow the $CH_4$-content and the flow rate to be ascertained at several measuring points during suction, the casing 1 being shifted in either direction in the borehole with almost permanently fully effective sealing, until the upper end of the casing is located adjacent to the position of maximum $CH_4$-yield.

As is known, for example, from West German Offenlegungsschrift No. 22 55 267.6, the seals 2, 6 can consist of an elastic core, provided with a lubricant composition and a coating, which is larger in cross-section than the diameter of the borehole, so that the elastic core is compressed on insertion and this reduction in volume effects an increase in stress. Furthermore, the seal can be composed of an elastic core, e.g. foamed rubber, attached to the tube, an overlying plastic sealing and lubricating composition and of a wear-resistant and extensible stretch coating, enclosing the core and the sealing composition.

After adjusting the suction casing 1 for maximum $CH_4$-yield, liquid synthetic material to be foamed, or its individual components, such as a hardener, is introduced, by way of feed nozzles 18a, 18b, into the annular space between the two seals 2, 6. For this purpose, cartridges may alternatively be provided in the annular space 3, the opening of which is then effected by suitable means, which can be passed through the inlets 18a,b of the seal 2. The quantity of the individual components of the liquid synthetic material has to be regulated, in this case, according to the volume of the annular space 3 to be filled. In this connection, the inlet nozzles 18a,b, which are preferably fitted as one or two tubes to the sleeve of the lower elastic seal 2, preferably terminate at the end of the sleeve where they can be closed with a plug. The plug can consist of a rubber stopper, which extends radially outwards on compression. The feed tube can however be also provided with a tubing, through which the mixture forming the polyurethane foam is forced in.

The sections 8 of the suction casing 1 are individual PVC plastics tubes 7, which have low flammability and are antistatic. Tubes of this type consist of a hard PVC material and are coated, on the inside and outside, with an electrically conductive surface. In this case, the individual tubular sections 8 can be connected in a simple manner by way of spigot and socket joints 9, comprising a tubular plug-in part 10, a tube socket part 11 and a triple edge seal part in the form of a rubber sleeve 12. It is only necessary, for this purpose, to clean and, optionally, grease the spigots 10, the sockets 11 and the rubber sleeves 12. Subsequently, a rubber sleeve 12 is placed onto a spigot 10, but no lubricant should be used on attaching the sleeve. It is to be observed, in this connection, that the spigot is moved into the sleeve up to the projection. Following this, the socket 11 of the tube that is to be connected has to be provided in the leading zone, e.g. the first 1 cm., with a thin layer of lubricant and the spigot 10, provided with the rubber sleeve 12, has to be moved, without turning, into the socket 11 up to the projection, (see FIGS. 4a,b).

As shown in FIG. 4c, for fixing connecting lines of vacuum devices, used for pumping off the gas mixture emanating from the borehole, a flange 13 is fitted on the end tubular section 8 of the gas suction casing 1 by means of a sleeve 11', a flange 14 for the connecting lines of the vacuum devices being connected to the sleeve.

For closing the gas suction tube 1, a closure stopper 15 can be introduced into the tube 8, as shown in FIG. 4d. As shown in FIG. 4e, the stopper essentially consists of a rubber sealing disc 17 and two discs 16, 16' clamping the rubber disc between them. The disc 16, which extends, in use, further into the casing possesses an internal screw thread 32 into which the threaded shank 33 of a hexagonal plug engages having passed through openings in the other disc 16 and in the rubber disc 17. Furthermore, a tapped bore extends through the shank for the screw connection of a measuring probe. This bore is closed on the outside by a closure 34 with an O-ring seal.

Figure 2:
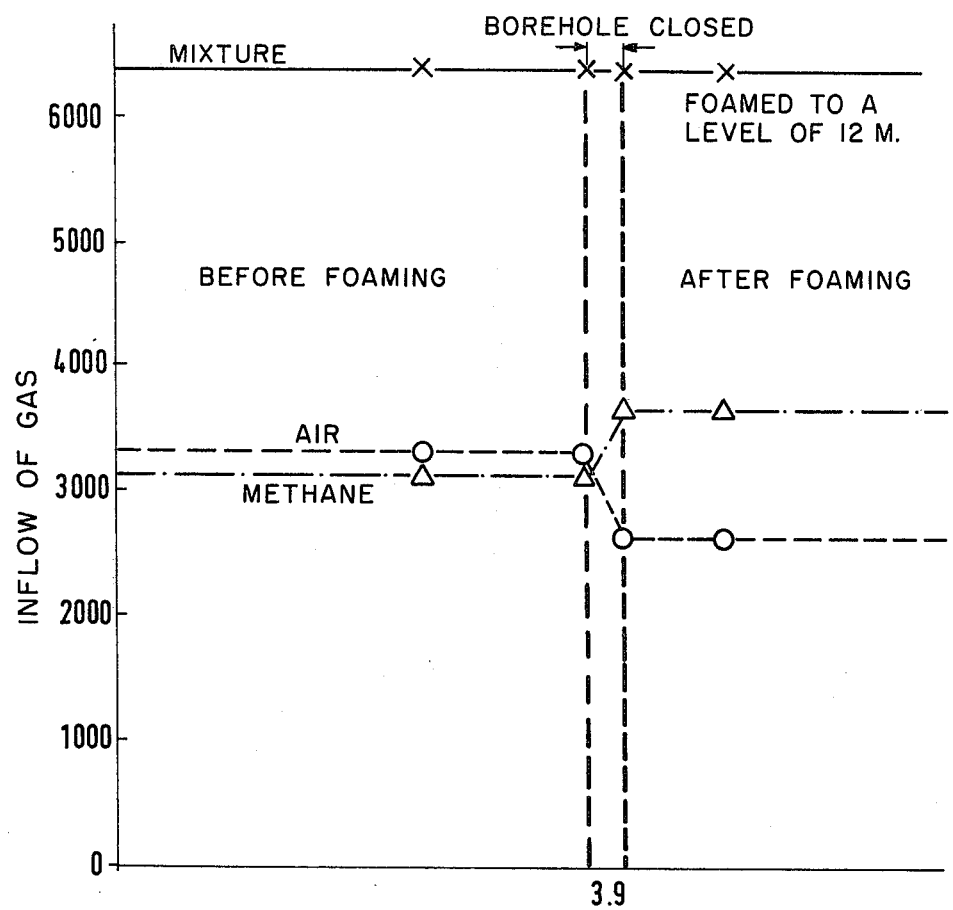
FIG. 2 shows two diagrams representing, one the yield of gas suction before and after the filling of the annular space with foam; and the other the $CH_4$-yield, related to the prevailing vacuum.
Figure 2:
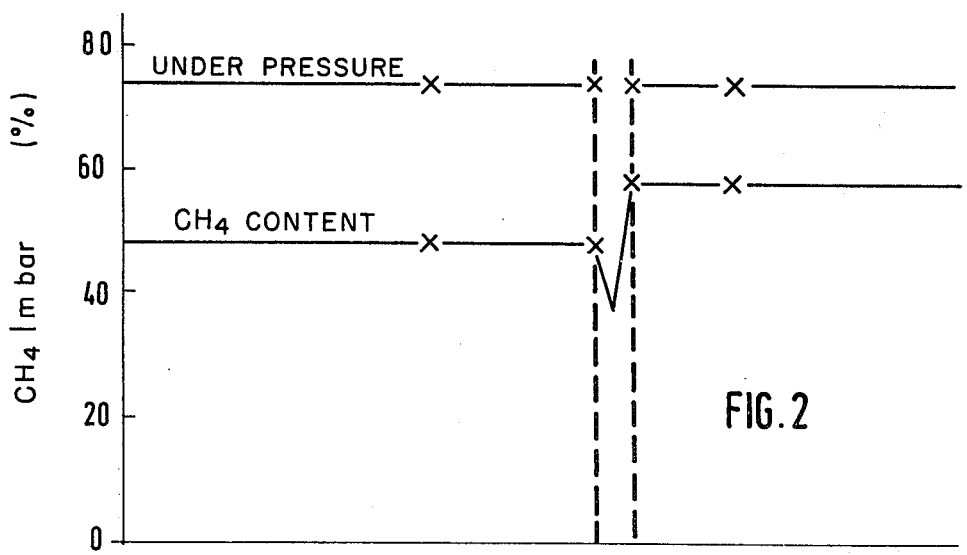

The considerably improved suction in the gas borehole, when using a polyurethane foam filling for the annular space, is illustrated by the diagrams of FIG. 2. These diagrams represent the inflow of gas or $CH_4$, related to the prevailing vacuum, before and after foaming. The foam level obtained is 12 m in this case, only a lower seal 2 having been provided. It can be clearly seen from the upper diagrams that the short circuit flow, resulting from weathering, clearly decreases after foaming, while the methane gas inflow increases. The total emanating and pumped out gas mixture is essentially constant in this case, according to the upper curve.

Since the gas suction casing 1 is adjusted initially in the drilling to maximize $CH_4$-yield and the short circuit flow from weathering is considerably reduced by the seal, substantial reduction in loading of the suction system for the gas suction casing, and better utilization of the vacuum efficiency of the pump, result. Furthermore, there is a more favourable $CH_4$-concentration in the flow, resulting in an increase in mine safety and an improvement in the efficiency of coal production because of the reduction of periods of shutdown caused by gas emission.

The introduction of the polyurethane foaming composition, in this case, is as simple as can be imagined, as these foamed plastics expand in volume on hardening and thus automatically move upwards in the borehole, the end-point of the filling of the borehole with foam being easily harmonized with the optimum $CH_4$-yield level. The polyurethane foam layer, in this case, is elastic and sets solid in the drilling channels and cracks of the boreholes. Optimum sealing thus results, so that short circuits from the zones of borehole wall excavations, unevennesses, distortions and non-circular boreholes are avoided with great certainty. Since the stress of the polyurethane plastics foam layer is transferred directly laterally to the borehole wall and, therefore, this plastics foam layer does not have to be pressed for sealing against a seam of a borehole constriction, in order to form an effective seal, time-consuming auxiliary drillings are rendered unnecessary.

The advantages of the PVC sections 8 employed consist, above all, in their low weight, in comparison with the steel tubes, usually employed heretofore, as a result of which the work of transport to the place of use and the handling in introducing the casing into the gas borehole is simplified. In this connection, the good elasticity of the plastics tubing is combined with that of the hard polyurethane plastics foam, so that, when the spigot and socket joints of the individual plastics tubes 8 are used, good adaption of the gas suction tube 1 to distortions of the boreholes within the range of the ground movement is ensured. Furthermore, the corrosion resistance and the smooth internal walls of the plastics tubes are of advantage, as a result of which friction losses are reduced in the gas flow in the gas suction casing 1 and, accordingly, pressure requirements are reduced.

A pumping device 19, used for the introduction of the liquid synthetic materials, is represented in FIG. 3. It essentially consists of a piston type rotary drilling machine 20, driven by compressed air, with oiler and ballcock connected in series. The drive of the rotary drilling machine 20 acts by way of a flexible Bowex coupling 21 on a heavy-duty gear double pump 22, by way of which the liquid synthetic material components, Baymidur K 88 and Baygal K 55 B, are fed by way of lines 23 and 24. The premixed but not yet foamed and hardened polyurethane foam is forced into the annular space 3 of the drilling by way of high pressure tubings 25, which are provided with manometers 29, a two way cock 30, and a circulation tube 21; a gravel mixer 26; an infusion probe 27; and a spring valve 28, which can be placed on to the feeder nozzles 18a,b for forcing in the liquid synthetic material components.

We claim:

1. In a method of drawing off gas by suction in coal mining by means of a sealed casing which is inserted in a borehole, the improvement comprising the steps of: sealing said casing to said borehole by a seal which permits movement of said casing in either direction along said borehole; moving said casing along said borehole and measuring $CH_4$ content of gas sucked into said casing at various positions along said borehole to determine a position of said casing in which gas with substantially the maximum $CH_4$ content can be sucked in; positioning said casing in a position to suck in gas with substantially the maximum $CH_4$ content; and at least partially filling an annular space formed between said casing and the wall of said borehole with a liquid which expands in said space to form a polyurethane foam.

2. A method according to claim 1, wherein said liquid which expands to form said polyurethane foam comprises a mixture of Baygal K55B and Baymidur K88, said Baygal K55B consisting of 100 parts by weight of Baygal K55 and 17.5 parts by weight of castor oil and from 0.5 to 3.0 parts by weight of water.

3. A method according to claim 1, wherein the step of at least partially filling an annular space with a liquid comprises forcing said liquid into said space by means of a gear pump.

4. A method according to claim 1, wherein the step of at least partially filling an annular space with a liquid comprises forcing said liquid into said space by releasing the liquid from a cartridge within said space.

5. A method according to claim 1, wherein said casing has a leading and a trailing end and is provided only at said trailing end with a permanently fully effective seal, and wherein the step of at least partially filling an annular space with a liquid comprises introducing such quantity of said liquid into said annular space that said polyurethane foam, upon hardening with increase in volume, expands up adjacent to said level in said borehole of maximum $CH_4$ yield.

6. A method according to claim 5, wherein said seal comprises an elastic core surrounded by a lubricant composition and a coating, the cross section of said core being normally larger than that of said bore hole whereby said core is compressed upon insertion into said bore hole.

7. A method according to claim 1, wherein said casing in a plastics tubing, having an electricaly conductive surface.

8. A method of withdrawing gas containing $CH_4$ from an undergound borehole comprising: providing a tubular casing having a leading end which terminates in a suction mouth and a trailing end and having an outer diameter smaller than the diameter of an underground borehole from which gas is to be withdrawn; inserting the leading end of the tubular casing into the borehole; sealing the leading end portion of the tubular casing to the borehole sidewall so as to permit lengthwise movement of the tubular casing along the borehole while maintaining the leading end portion of the tubular casing in sealed relationship with the borehole sidewall; positioning the tubular casing along the borehole so that the suction mouth of the leading end of the tubular casing is suitably positioned to withdraw therethrough gas with substantially the maximum $CH_4$ content from the borehole; sealing at least the lower part of the annular space formed between the trailing end portion of the tubular casing and the borehole sidewall with a dosed injection of liquid which expands in the annular space to form an annular foam seal; and applying suction to the tubular casing to withdraw through the suction mouth of the tubular casing leading end gas with substantially the maximum $CH_4$ content from the borehole.

9. A method according to claim 8; wherein the step of positioning the tubular casing along the borehole comprises moving the tubular casing along the borehole while applying suction to the tubular casing to withdraw gas from the borehole, measuring the $CH_4$ content of the withdrawn gas at different positions of the tubular casing along the borehole, and positioning the tubular casing so that gas with substantially the maximum $CH_4$ content is withdrawn from the borehole.

10. A method according to claim 8 or 9; wherein the step of sealing at least the lower part of the annular space comprises introducing a dosed injection of the liquid by releasing the liquid from a set of cartridges disposed within the annular space.

11. A method according to claim 8 or 9; wherein the step of sealing at least the lower part of the annular space comprises sealing substantially the entire annular space from the trailing end portion of the tubular casing to the sealed leading end portion of the tubular casing.

12. A method according to claim 8 or 9; wherein the annular foam seal is comprised of polyurethane.

* * * * *